US012456225B2

(12) United States Patent
Yamazaki et al.

(10) Patent No.: US 12,456,225 B2
(45) Date of Patent: Oct. 28, 2025

(54) METHODS FOR INFIELD CAMERA CALIBRATIONS

(71) Applicant: Apple Inc., Cupertino, CA (US)

(72) Inventors: Shuntaro Yamazaki, Cupertino, CA (US); Ravi Teja Sukhavasi, Fremont, CA (US); Oleg Naroditsky, San Francisco, CA (US); Stergios Roumeliotis, Los Altos Hills, CA (US); Daniel C Byrnes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 18/466,379

(22) Filed: Sep. 13, 2023

(65) Prior Publication Data
US 2024/0095958 A1 Mar. 21, 2024

Related U.S. Application Data

(60) Provisional application No. 63/375,840, filed on Sep. 15, 2022.

(51) Int. Cl.
H04N 5/247 (2006.01)
G06T 7/00 (2017.01)
(Continued)

(52) U.S. Cl.
CPC .............. *G06T 7/80* (2017.01); *G06T 7/0002* (2013.01); *G06T 7/20* (2013.01); *G06V 10/761* (2022.01);
(Continued)

(58) Field of Classification Search
CPC ........ H04N 23/695; H04N 5/247; G06T 7/80; G06T 7/0002; G06T 7/20; G06T 2207/30168; G06V 10/761; G06V 2201/07
(Continued)

(56) References Cited

U.S. PATENT DOCUMENTS 9,686,539 B1 * 6/2017 Zuliani ................ H04N 13/246
9,706,188 B2 7/2017 Yu et al.
(Continued)

FOREIGN PATENT DOCUMENTS

CN 116295525 6/2023

OTHER PUBLICATIONS

Youwei, et al., "Fast Extrinsic Calibration for Multiple Inertial Measurement Units in Visual-Inertial Systems," 2023 IEEE International Conference on Robotics and Automation (ICRA 2023) pp. 11481-11487.
(Continued)

Primary Examiner — Trang U Tran
(74) Attorney, Agent, or Firm — Alexander A. Knapp; Kowert, Hood, Munyon, Rankin & Goetzel, P.C.

(57) ABSTRACT

Methods for performing a calibration process for outward-facing cameras on devices such as head-mounted display devices are disclosed. Extrinsic parameters of the camera are first estimated using inputs to the calibration process such as information from an inertial measurement unit and points of interest within images captured by the camera that are tracked with time. Then, extrinsic and intrinsic parameters are concurrently determined in an optimization problem such that updated values of said parameters may be stored and used by applications that run on the device and make use of the camera. The calibration process may be extended to concurrently calibrate multiple cameras based, at least in part, on information from the inertial measurement unit that is local to the camera.

20 Claims, 10 Drawing Sheets

(51) Int. Cl.
- *G06T 7/20* (2017.01)
- *G06T 7/80* (2017.01)
- *G06V 10/74* (2022.01)
- *H04N 23/695* (2023.01)

(52) U.S. Cl.
 CPC . *H04N 23/695* (2023.01); *G06T 2207/30168* (2013.01); *G06V 2201/07* (2022.01)

(58) Field of Classification Search
 USPC .......................................................... 348/187
 See application file for complete search history.

(56) References Cited

U.S. PATENT DOCUMENTS

| | | | |
|---|---|---|---|
| 9,986,173 B2* | 5/2018 | Wang | H04N 17/002 |
| 10,096,114 B1 | 10/2018 | Lasenby | |
| 10,218,885 B2 | 2/2019 | Hollinger | |
| 10,488,223 B1* | 11/2019 | Yee | G01C 25/005 |
| 10,719,727 B2 | 7/2020 | Stanimirovic et al. | |
| 10,803,624 B2* | 10/2020 | Ziegler | G06T 7/85 |
| 10,839,557 B1* | 11/2020 | Arora | G06T 19/006 |
| 11,041,958 B2 | 6/2021 | Li et al. | |
| 11,244,649 B2 | 2/2022 | Chi et al. | |
| 11,348,281 B1* | 5/2022 | Tang | H04N 13/246 |
| 11,680,824 B1 | 6/2023 | Navin et al. | |
| 11,709,236 B2 | 7/2023 | Smits | |
| 11,776,160 B2 | 10/2023 | Deng et al. | |
| 2015/0279017 A1 | 10/2015 | Tamura | |
| 2017/0094251 A1 | 3/2017 | Wolke | |
| 2018/0108150 A1* | 4/2018 | Curtis | G06T 7/246 |
| 2019/0197982 A1 | 6/2019 | Chi | |
| 2019/0208181 A1 | 7/2019 | Rowell | |
| 2020/0007843 A1* | 1/2020 | Zhang | G06T 7/85 |
| 2020/0027243 A1 | 1/2020 | Ziegler | |
| 2020/0132451 A1 | 4/2020 | Wei | |
| 2022/0137636 A1 | 5/2022 | Yang et al. | |
| 2023/0005184 A1 | 1/2023 | Jiang et al. | |
| 2023/0066919 A1 | 3/2023 | Navin et al. | |
| 2023/0141515 A1 | 5/2023 | Danziger | |
| 2023/0245345 A1* | 8/2023 | Peuhkurinen | G06T 7/73 382/155 |
| 2023/0277249 A1 | 9/2023 | Bork et al. | |
| 2023/0283757 A1 | 9/2023 | Handa et al. | |
| 2023/0296902 A1 | 9/2023 | Birklbauer | |
| 2023/0306682 A1 | 9/2023 | Paris et al. | |
| 2023/0401687 A1 | 12/2023 | Winters | |
| 2024/0371035 A1 | 11/2024 | Jadhav | |

OTHER PUBLICATIONS

U.S. Appl. No. 18/466,373, filed Sep. 13, 2023, Daniel C. Byrnes, et al.

U.S. Appl. No. 18/466,326, filed Sep. 13, 2023, Tianheng Wang, et al.

U.S. Appl. No. 18/466,437, filed Sep. 13, 2023, Stergios Roumeliotis, et al.

* cited by examiner

METHODS FOR INFIELD CAMERA CALIBRATIONS

PRIORITY DATA

This application claims benefit of priority to U.S. Provisional Application Ser. No. 63/375,840, entitled "Methods for Infield Camera Calibrations", filed Sep. 15, 2022, and which is incorporated herein by reference in its entirety.

BACKGROUND

Discussion of Background

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and systems for calibrating cameras on devices such as head-mounted display devices (HMDs) including but not limited to HMDs used in virtual reality (VR), augmented reality (AR), mixed reality (MR), and/or extended reality (XR) applications are described. HMDs may include wearable devices such as headsets, helmets, goggles, or glasses. A system may include an HMD which may include one or more cameras that may be used to capture still images or video frames of the user's environment. The HMD may include lenses or displays positioned in front of the eyes through which the wearer can view the environment. In such systems, virtual content may be displayed on or projected onto these lenses or displays to make the virtual content visible to the wearer. In some embodiments, the wearer may view the virtual content while still being able to view the real environment through the lenses.

Calibration of the camera(s) of a given device involves determining intrinsic and extrinsic parameters of the camera using points of interest tracked within images captured by the camera(s) for a series of moments of time and also involves the input of information from an inertial measurement unit that is local to the device. By conducting the calibration process in two stages, the calibration process is robust against converging onto local minima and is efficient in terms of power consumption savings.

Figure 1A:
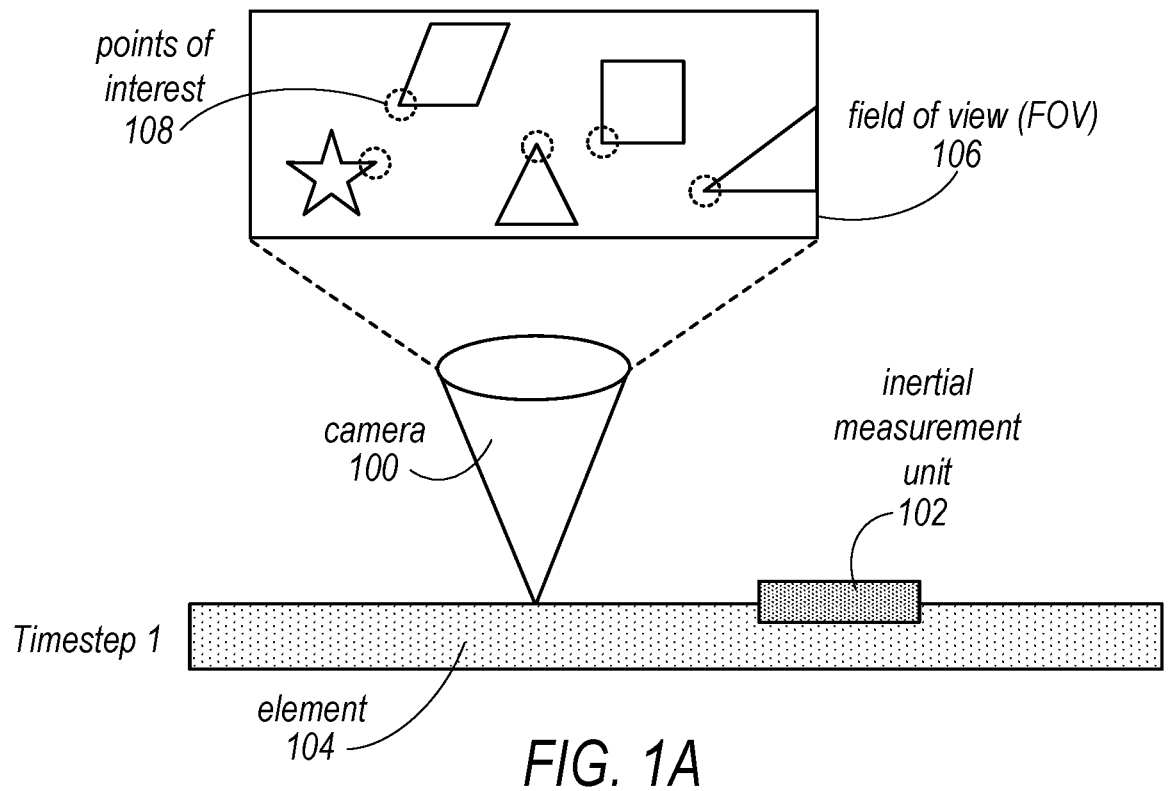
FIGS. 1A and 1B illustrate a process of tracking points of interest in a given field of view of a camera on a device at multiple points in time, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and techniques for calibrating intrinsic and extrinsic parameters of cameras on devices such as head-mounted display devices (HMDs) are described. During usage of the given device (e.g., an HMD), parameters of the cameras may drift from original calibration values (e.g., due to thermal effects, due to aging of materials, due to a drop event, etc.) and may require recalibration in a way that is both robust and efficient for the device (e.g., depending upon current power availability/consumption of the device, user comfort, the running of additional programs/algorithms that also may require processing power, etc.). This may also be referred to as an "infield" calibration of the camera as the calibration may take place in an environment (e.g., "in the field") as opposed to in a factory at the time of manufacture of the device.

"Extrinsic parameters of the camera" may be used herein to refer to rotational and translational orientation of the camera relative to a rigid body of the given device and/or another component of the given device. Additionally, extrinsic parameters determined via a calibration process, as described herein, may include any other relevant extrinsic parameters for a camera as would be generally understood by those skilled in the art. For example, extrinsic parameters may define a pose (e.g., position and/or orientation) of the camera relative to a reference structure, such as a frame of a device, another camera, an inertial measurement unit, or other suitable reference. In a similar manner, intrinsic parameters, as used herein, should be understood to encompass various types of internal parameters related to cameras, such as a focal length, a pixel size, an image origin, and/or other parameters used by those skilled in the art to specify internal parameters of a camera.

In some embodiments, calibration of the camera may be part of a larger visual-inertial odometry (VIO) algorithm which may combine information from an inertial measurement unit (IMU) of the device and one or more cameras of the device in order to measure a state vector and determine position and orientation of the device. The information from the inertial measurement unit may then also be used to complete the calibration of the camera(s), in particular the extrinsic parameters of the camera. As the inertial measurement unit may comprise three orthogonal gyroscopes that measure rotational velocity of the device and three orthogonal accelerometers that measure the acceleration along corresponding axes, position and orientation of the device may be calculated by integrating these signals of the inertial measurement unit. These position and orientation values may then be used as input values in order to determine extrinsic parameters of the camera(s) with reference to the inertial measurement unit.

In some embodiments, calibration of camera(s) of the device may resemble a high-dimensional optimization problem in which intrinsic and extrinsic parameters of the camera may be concurrently determined. In order to aid the speed of convergence to the optimal values and avoid converging instead on local minima, the calibration process may be divided into two stages. In a first stage, extrinsic parameters of the camera may be estimated using information from the inertial measurement unit. Then, in a second stage, the intrinsic and extrinsic parameters may be determined concurrently within the optimization problem. The estimated extrinsic parameters of the first stage may also be used as input to the second stage.

In some embodiments, camera(s) and an inertial measurement unit may be mounted on a head-mounted display device, and/or another device that may require infield calibration of the cameras. Head-mounted display devices may include wearable devices such as headsets, helmets, goggles, or glasses. In some embodiments, a system may include a head-mounted display device which may include one or more cameras that may be used to capture still images or video frames of the user's environment. In addition, a head-mounted display device may be implemented that does not necessarily provide certain AR/VR/MR/XR capabilities but that does include one or more cameras that may be used to capture still images or video frames of the user's environment. The head-mounted display device may include lenses and/or displays positioned in front of the eyes through which the wearer can view the environment. In some systems, virtual content may be displayed on or projected onto these lenses to make the virtual content visible to the wearer while still being able to view the real environment through the lenses. Such methods of camera calibrations may also be applied for devices that have one or more cameras, such as a tablet, smartphone, etc.

This written description continues with a general description of an infield camera calibration process. Examples of the two-stage camera calibration process are then discussed, along with extensions for calibrating multiple cameras concurrently and/or a cover glass for the camera(s). Finally, a description of an example computing system upon which the various components, modules, systems, devices, and/or calibration algorithms may be implemented is provided. Various examples are provided throughout the specification. A person having ordinary skill in the art should also understand that the previous and following description of a two-stage, infield camera calibration process is not to be construed as limiting as to the implementation of the calibration process, or portions thereof.

Figure 1B:
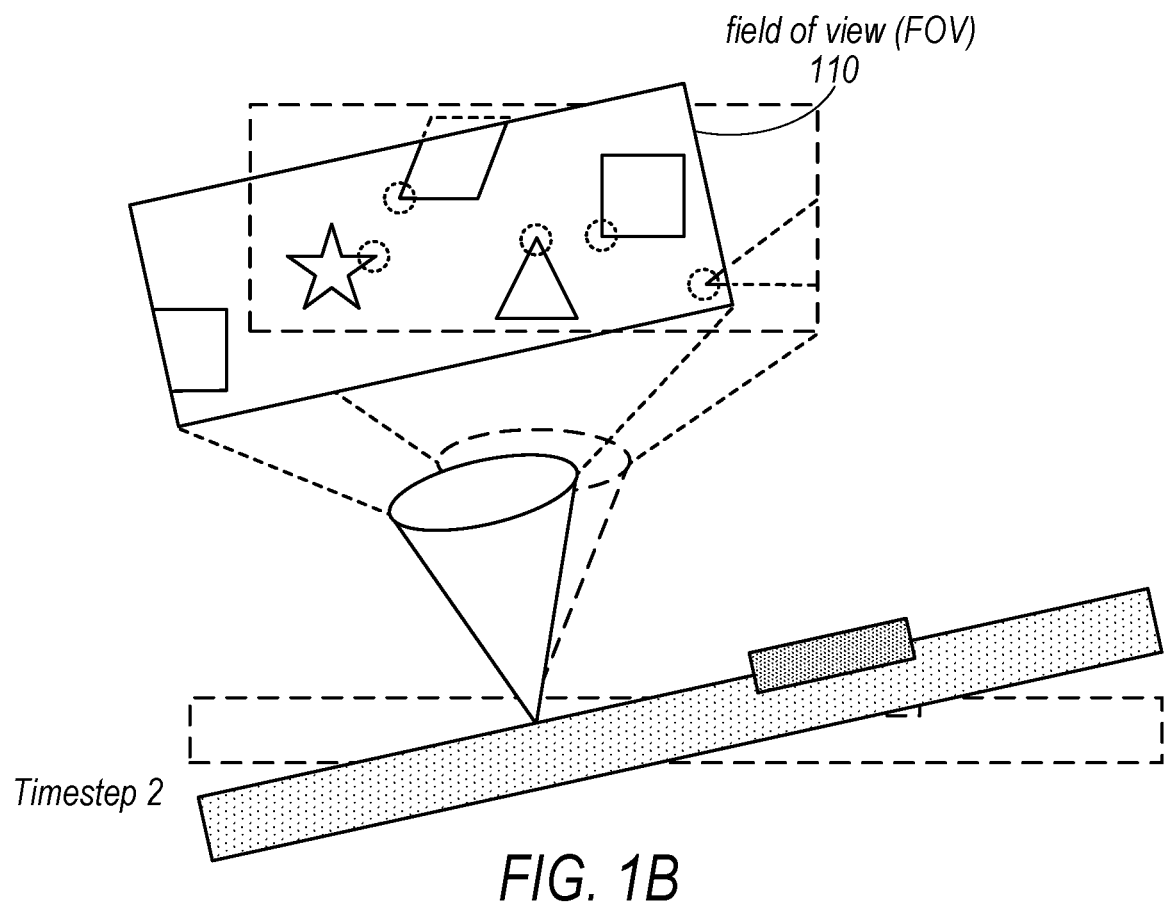

FIGS. 1A and 1B illustrate a process of tracking points of interest in a given field of view of a camera on a device at multiple points in time, according to some embodiments.

Calibrations for camera 100 may include calibration of the extrinsic (e.g., rotational and translational) and intrinsic (e.g., principal point and focal length) parameters of the camera. As mentioned above, "extrinsic parameters of the camera" may be used herein to refer to rotational and translational orientation of the camera relative to a rigid body of the given device and/or another component of the given device. Additionally, extrinsic parameters determined via a calibration process, as described herein, may include any other relevant extrinsic parameters for a camera as would be generally understood by those skilled in the art. For example, extrinsic parameters may define a pose (e.g., position and/or orientation) of the camera relative to a reference structure, such as a frame of a device, another camera, an inertial measurement unit, or other suitable reference. In a similar manner, intrinsic parameters, as used herein, should be understood to encompass various types of internal parameters related to cameras, such as a focal length, a pixel size, an image origin, and/or other parameters used by those skilled in the art to specify internal parameters of a camera. For example, extrinsic parameters of camera 100 may be interpreted as rotational and translational parameters of camera 100 with respect to inertial measurement unit 102, which may be mounted onto element 104 (e.g., wherein element 104 may represent a locally rigid support). In some embodiments, extrinsic parameters of the camera may be first estimated by comparing to information of inertial measurement unit 102. For example, as shown in FIGS. 1A and 1B, points of interest 108 within field of view 106 of camera 100 may be tracked for a series of moments in time (e.g., timestep 1 in FIG. 1A and timestep 2 in FIG. 1B). As shown in FIGS. 1A and 1B, field of view 110 at timestep 2 has shifted with respect to the position of field of view 106 at timestep 1. In some embodiments, camera 100 may be an outward-facing camera that captures images of a scene and/or environment (see the description for devices 800 and 900 herein). Camera 100 may be defined as a sensor that either directly or indirectly measures direction and/or distance in three-dimensional space using captured images (e.g., RGB color sensors, event-based cameras, night vision cameras, color cameras, etc.).

Points of interest that are selected to be tracked may be defined as points within images captured by camera 100 that remain within the camera's field of view for a given series of moments in time (e.g., timestep 1 to timestep 2). A person having ordinary skill in the art should understand that points of interest 108 are meant to be representative of given distinct and/or identifiable components of images captured by the camera (e.g., components at various distances between one another and the camera, of various sizes with respect to one another, etc.), and should not be misconstrued as being representative of the only types of points of interest that may be selected and tracked over time. Also, note that while the term "points of interest" is used for ease of explanation, in some embodiments, a "point of interest" may have various shapes and is not limited to items defined by a single point.

In some embodiments, selection of points of interest may depend on certain quality characteristics of images captured by camera 100. For example, ideal points of interest that may be used as one or more inputs to a camera calibration process for camera 100 may represent a distribution of points across multiple regions of fields of view 106 and 110. The ideal points of interest may also represent points in a given scene captured by camera 100 that are within a given focusing range of the camera (e.g., the points are not out-of-focus and/or blurred due to being too close or too far away from the camera). In some embodiments, points of interest may be selected based on how close the respective points of interest resemble such "ideal points of interest." Points of interest that are selected to be tracked over time may also depend on lighting quality of a scene represented in the captured images (e.g., having images that are neither too dark nor too saturated) and/or a texture within the scene. For example, there may be a limited number of points of interest available to be selected if a user of a device is facing a blank wall, also known as a low-texture scene, versus if the user of the device is facing a wall with patterned wallpaper. Furthermore, additional quality characteristics may be used that pertain to an amount of movement occurring between times when the images were captured by the camera. For example, tracking points of interest over time may require an ability to locate a change in position of a given point of interest between timestep 1 and timestep 2. If there is too much movement between the timesteps (or the potential point of interest moves out of focus of the camera, etc.), the quality of the selected points of interest may be limited.

In some embodiments, such as those shown in FIGS. 1A and 1B, it may be assumed that camera 100 and inertial measurement unit 102 may be mounted onto a rigid body of a given device (e.g., element 104). Therefore, any motion, such as the motion shown between FIGS. 1A and 1B, may be assumed to be due to the movement of the device (e.g., a user with the device attached to their head turning their head, stepping forward/backward, etc.). In some embodiments, the camera 100 and the inertial measurement unit may be mounted on a non-rigid body of a given device that is converted into a rigid arrangement when worn by a user. For example, an elastic band to which the components are attached may function as a rigid structure when tightly affixed to a user's body, such as the user's head.

Figure 2:
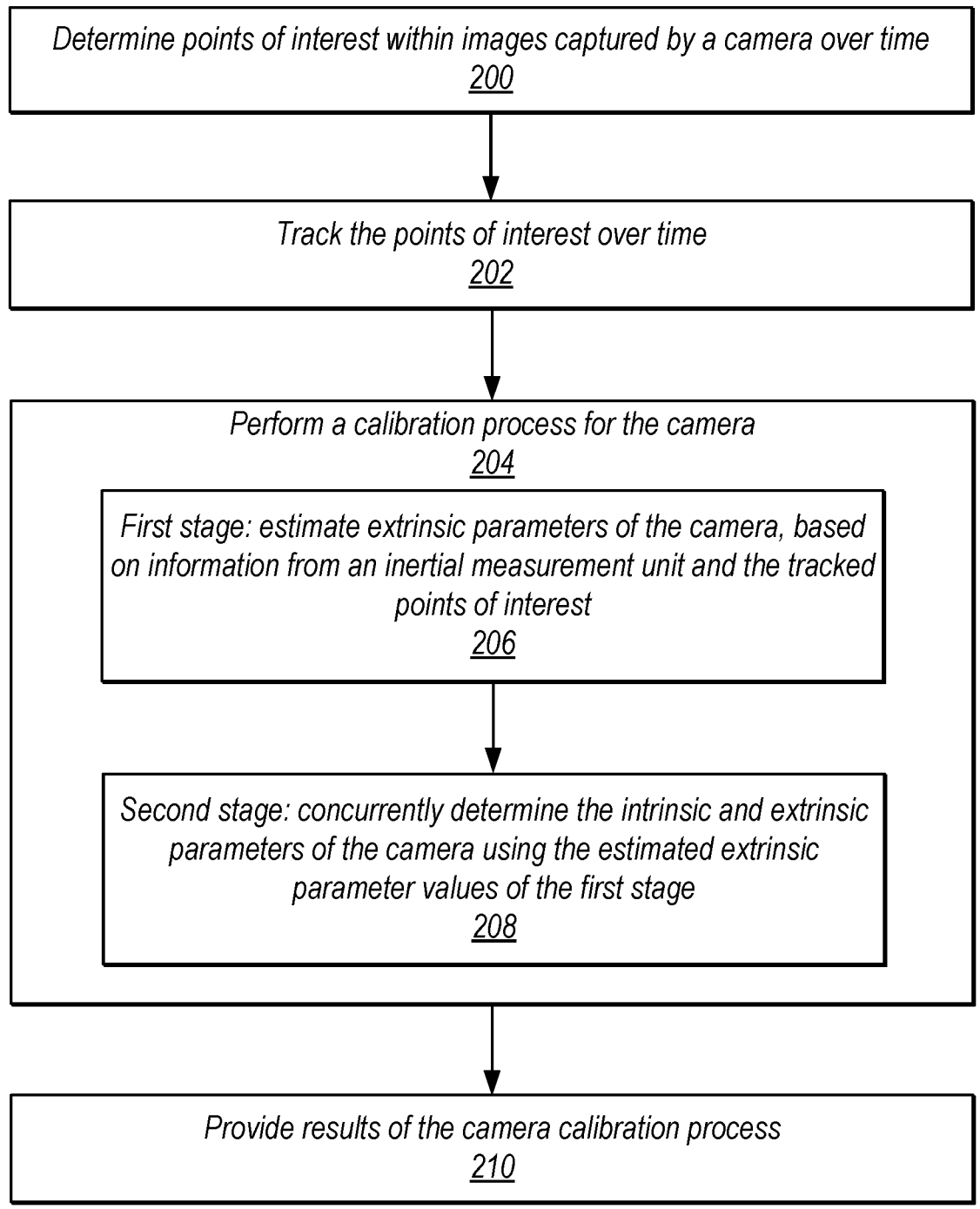
FIG. 2 is a flow diagram illustrating a process of performing a calibration process for a camera in which a first stage of the calibration process estimates the extrinsic parameters of the camera and the second stage concurrently determines both the extrinsic and intrinsic parameters, according to some embodiments.

FIG. 2 is a flow diagram illustrating a process of performing a calibration process for a camera in which a first stage of the calibration process estimates the extrinsic parameters of the camera and the second stage concurrently determines both the extrinsic and intrinsic parameters, according to some embodiments.

In some embodiments, the methods and techniques described herein for calibrating cameras may resemble the flow diagram illustrated in FIG. 2. In block 200, points of interest are identified (e.g., points of interest 108) within images that have been captured by a camera (e.g., camera 100) over a series of moments in time (such as at least timestep 1 and timestep 2). The points of interest may then be tracked over time according to block 202. For example, as shown in FIGS. 1A and 1B, four points of interest are tracked at timestep 1 and timestep 2, wherein the field of view of camera 100 has changed between timestep 1 and timestep 2 due to motion of the device.

In block 204, a calibration process for the camera is performed in order to recalibrate the camera. The calibration process steps shown in blocks 204, 206, and 208 may be performed on one or more processors of a computer system, such as computer system 1100, that may be locally or remotely located to the device, according to some embodiments.

In some embodiments, information from the inertial measurement unit and information about the tracked points of interest of block 202 may be used as input to the calibration process, and the calibration process may include two stages, as shown by blocks 206 and 208. In block 206, extrinsic parameters of the camera may be estimated using said inputs. The estimated extrinsic parameters of the camera of the first stage may then be used as input to the second stage, described by block 208, in which the extrinsic and intrinsic parameters are determined concurrently within a given optimization problem. By providing initial inputs (e.g., information from the inertial measurement unit, information about the tracked points of interest, and the estimated extrinsic parameter values), the calibration process may reach convergence more quickly and efficiently, and without becoming stuck in local minima due to the high-dimensionality of the optimization problem. In some embodiments, the inputs from the inertial measurement device may include one or more of: acceleration in X, Y, or Z direction and/or angular acceleration about the X, Y, or Z axis. Also, in some embodiments, inputs from the inertial measurement unit may be associated with moments in time, such that times at which translational or angular acceleration were measured by the inertial measurement unit can be mapped to times at which respective images were captured by the camera.

In block 210, the results of the calibration process (e.g., values for the extrinsic and intrinsic parameters of the camera) may be provided. For example, the results may be provided to other applications executing on the given device that use the camera. The results may additionally be stored locally on the device, such as in memory 1120 of computer system 1100, and/or communicated to input/output device(s) 1150, according to some embodiments. Such functionalities may be defined as "broadcasting" the results. Furthermore, the processors that execute the calibration process described by blocks 204, 206, and 208 may also determine whether or not to broadcast the results of the calibration process. For example, in some embodiments in which the calibration process for the camera is executed periodically while a user is using a device, if the processors determine that calibration results of an updated calibration process execution have not changed significantly (e.g., not by larger than a given threshold), the processors may determine that the updated results do not need to be broadcast and/or communicated to other applications executing on the device. In a second example, if the processors determine that calibration results of an updated calibration process execution have changed significantly (e.g., by larger than a given threshold), then the processors may proceed with broadcasting the results of the updated calibration process.

Figure 3A:
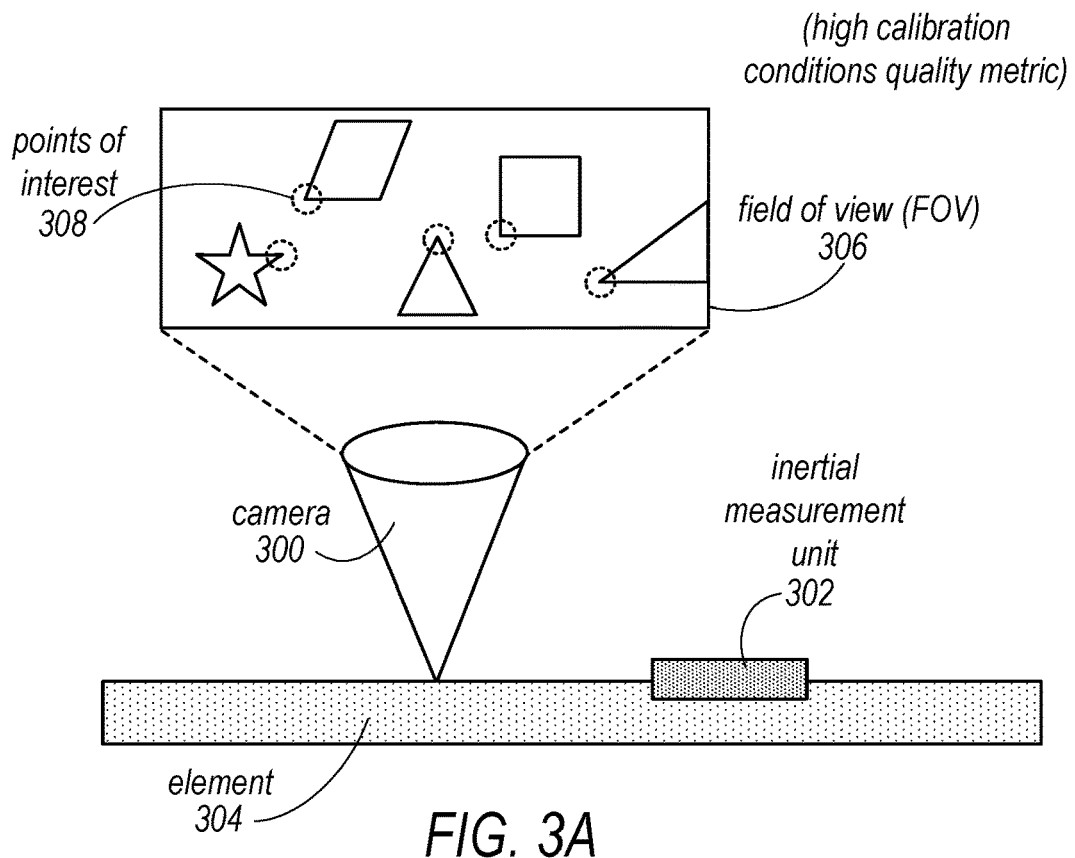
FIGS. 3A and 3B illustrate examples of criteria that contribute to a high or low calibration conditions quality metric, respectively, for a camera of a device, according to some embodiments.
Figure 3B:
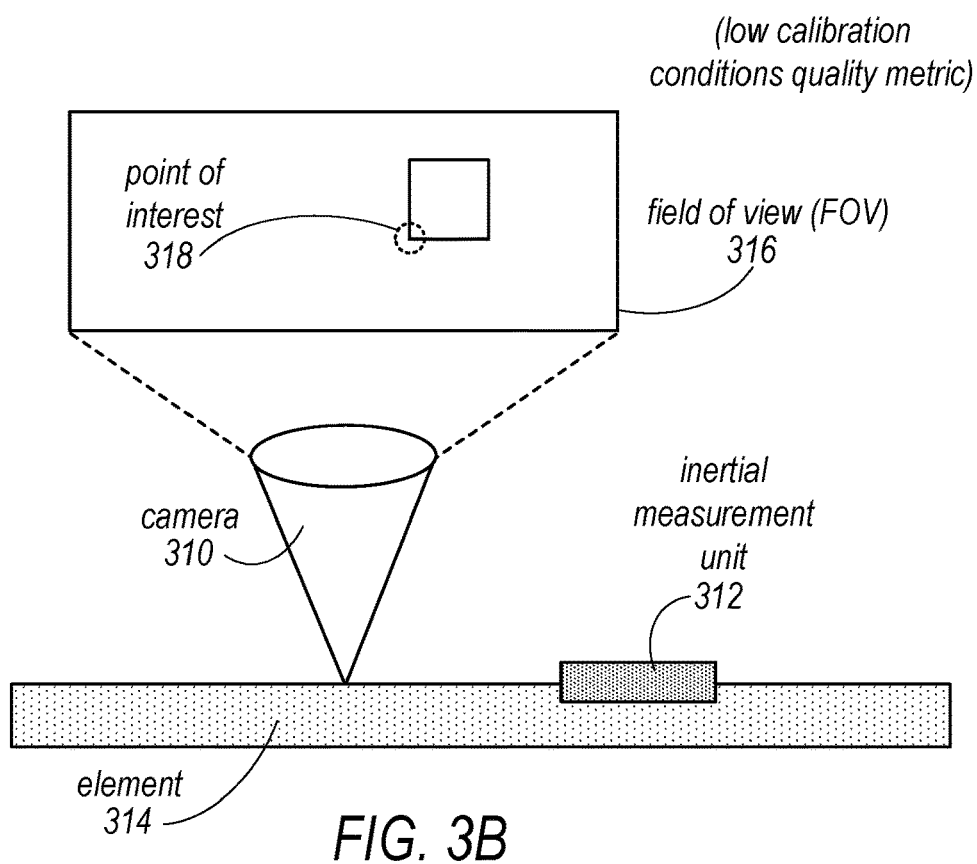

FIGS. 3A and 3B illustrate examples of criteria that contribute to a high or low calibration conditions quality metric, respectively, for a camera of a device, according to some embodiments.

In some embodiments, the processors that execute the camera calibration process may also calculate a calibration conditions quality metric prior to proceeding with executing the calibration process. In some embodiments, the calibration conditions quality metric may resemble a learning rate, and/or a covariance term.

In some embodiments in which the recently captured images of the camera are of low quality for camera calibration purposes (e.g., there is insufficient lighting, the images captured are from a low texture scene, and/or other scenarios that lead to a low number and/or low quality points of interest that may be tracked over a given period of time), the calibration conditions quality metric may act as a confidence value related to the expected success (or not) of proceeding with executing the calibration process given the conditions of the images captured by the camera. Such a confidence value may, at least in part, determine whether or not the processors proceed with executing the calibration process. The processors may refrain from performing the calibration process if the calibration conditions quality metric is below a given threshold, while the processors may proceed with performing the calibration process if the calibration conditions quality metric is above the given threshold.

In some embodiments, the calibration conditions quality metric may be a value between zero and one. For example, when the processors determine that conditions are unreliable for an accurate calibration convergence, the calibration conditions quality metric may be close to zero. In a second example, when the processors determine that there are sufficient conditions and points of interest to attempt an execution of the camera calibration process, the calibration conditions quality metric may be close to one. The calibration conditions quality metric may then be used as input to the camera calibration process (e.g., block 204). In such embodiments, the calibration conditions quality metric may be used to help instruct the processors to proceed with the calibration process, but any updated parameters resulting from said calibration process may still be associated to a low confidence of success if the calibration conditions quality metric is above the given threshold but still far below one, for example. Note that in some embodiments a threshold value with respect to the calibration conditions quality metric for preceding (or refraining) from performing calibration may be an analog value between 0 and 1 (e.g., 0.7, 0.8, 0.9, etc.). In some embodiments various other scoring scales may be used, such as scores from 0 to 100, etc.

Furthermore, in some embodiments in which the calibration conditions quality metric is at or close to a minimal value (e.g., zero), the processors may continue to wait for more sufficient input data (e.g., continue to determine points of interest and track them for a longer period of time, as discussed with regard to blocks 200 and 202). For example, if a user of the device were to accidentally cover or obstruct the field of view of the camera, the calibration conditions quality metric may be set to a low value, such as zero, and the camera calibration process execution may proceed at a point in time after this particular event has ended.

FIGS. 3A and 3B represent embodiments of high and low calibration conditions quality metrics, respectively. As shown in FIG. 3A, camera 300 and inertial measurement unit 302 are mounted onto element 304. Field of view 306 may represent the field of view at a moment of a captured image, in which there may be multiple potential points of interest that may be tracked over time, as represented by points of interest 308. In some embodiments, FIG. 3A may resemble some embodiments in which the processors would calculate a high calibration conditions quality metric, as there are multiple points of interest distributed across the field of view, acceptable lighting, low movement within the captured image, etc., for example. FIG. 3B may resemble a scenario in which the processors would calculate a low calibration conditions quality metric, according to some embodiments. For example, if point of interest 318 within field of view 316 of camera 310 was determined to be the only viable point of interest that may be tracked with time, this may be insufficient information for the camera calibration process to proceed with. FIG. 3B may also represent additional scenarios in which there is not sufficient movement of the device onto which camera 310 and inertial measurement unit 312 are mounted onto via element 314, which would lead to insufficient information that may be obtained by the inertial measurement unit for use as input in the camera calibration process, according to some embodiments.

The calibration conditions quality metric may also be used to help determine whether or not to broadcast the results of the calibration process, according to some embodiments. As discussed with regard to block 210, the results of the calibration process may be communicated to additional applications executing on the device that may rely on the camera. However, if the calibration conditions quality metric is low, then even if the calibration process indeed converged onto updated extrinsic and intrinsic parameters of the camera, the calibration conditions quality metric may place a low confidence level onto these updated parameters, and, as a result, the updated parameters may not be broadcast to additional applications executing on the device.

Figure 4:
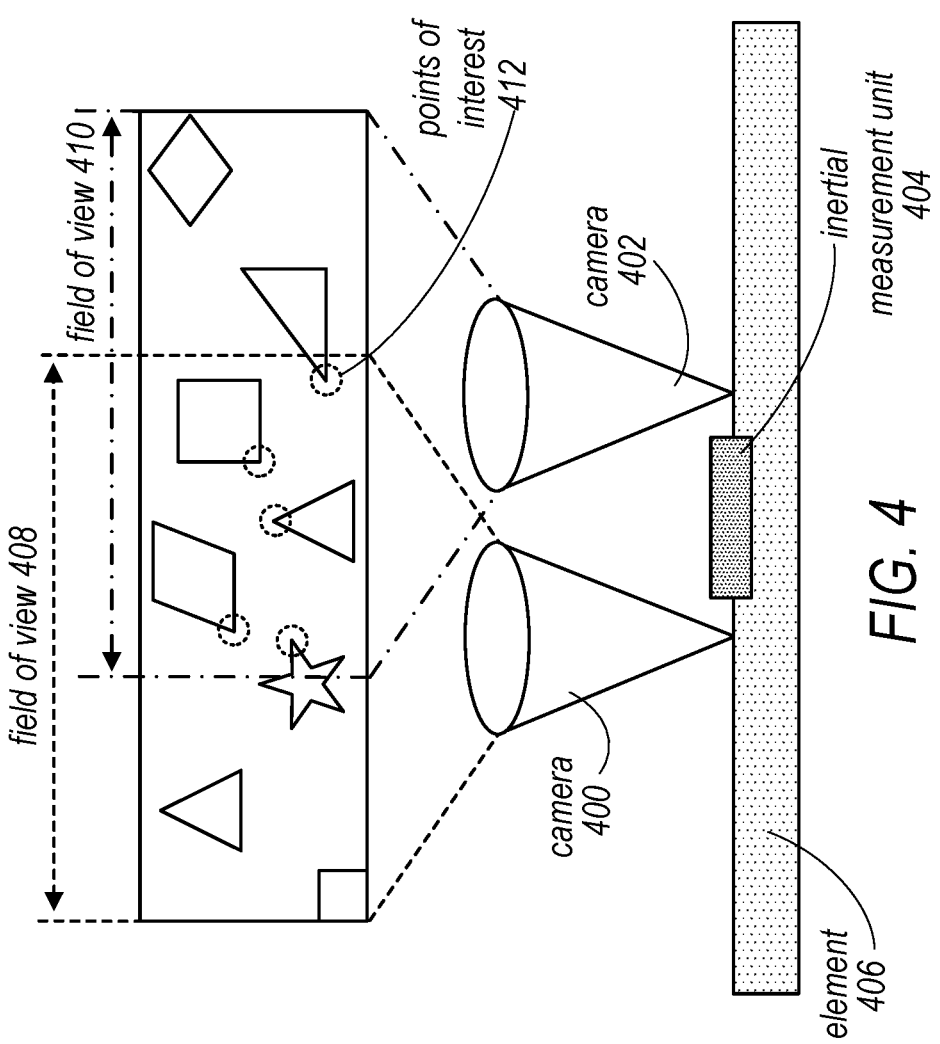
FIG. 4 illustrates a process of tracking common points of interest between two cameras with overlapping fields of view, according to some embodiments.
Figure 5:
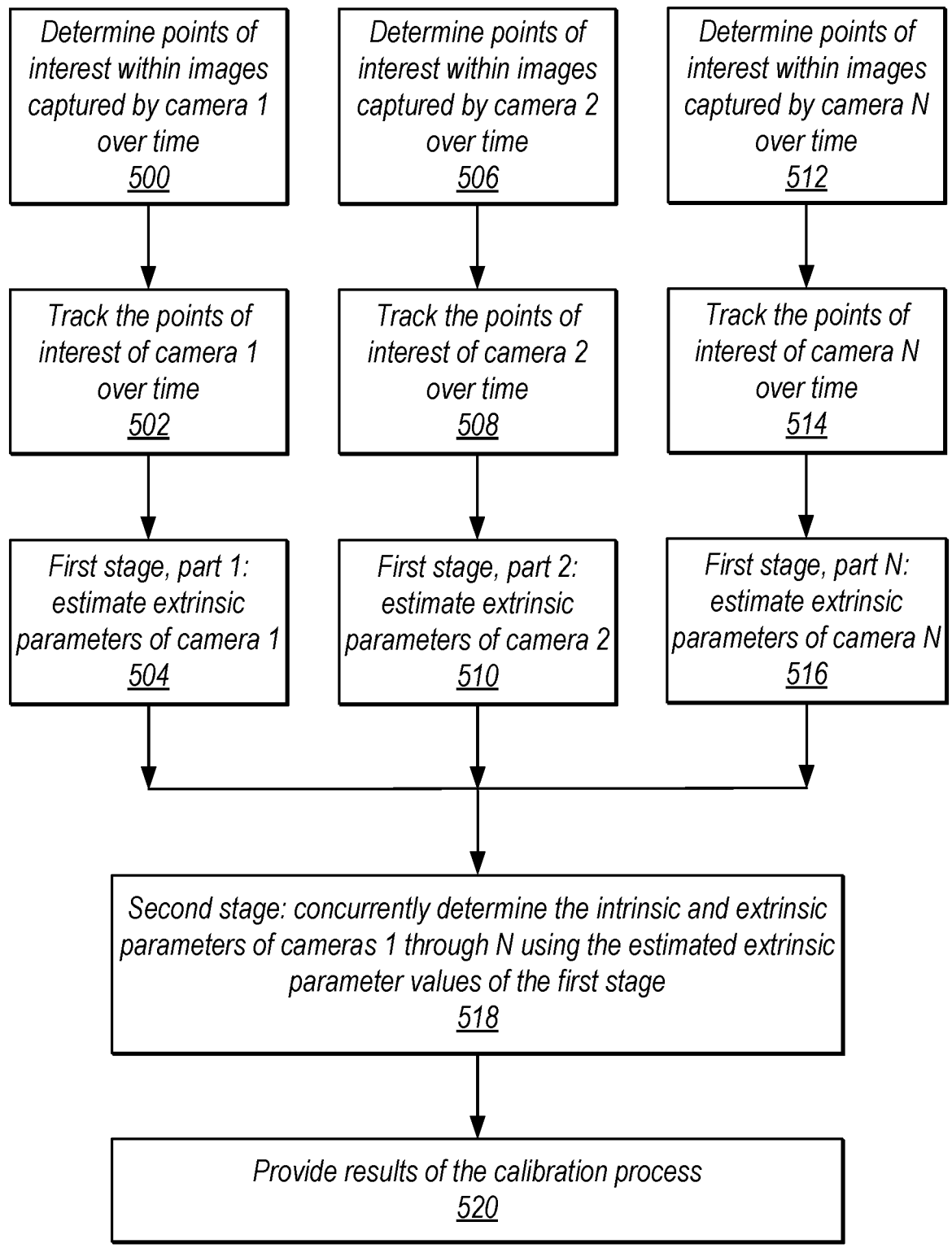
FIG. 5 is a flow diagram illustrating a process of performing a calibration process for N cameras concurrently, according to some embodiments.

Furthermore, in some embodiments such as those described herein with regard to at least FIGS. 4 and 5, more than one camera may be calibrated concurrently. In such embodiments, respective calibration conditions quality metrics may be calculated for each camera. For example, if a user is accidentally covering/obscuring a first camera, but not a second camera, then the calibration conditions quality metric for the first camera may be lower than the metric for the second camera. As such, the processors may decide not to proceed with calibration processes for either camera, or may decide to proceed with the calibration of the second camera but not the first camera. In other embodiments, a collective or joint calibration conditions quality metric may be calculated for all cameras that may be calibrated in the following camera calibration process.

FIG. 4 illustrates a process of tracking common points of interest between two cameras with overlapping fields of view, according to some embodiments.

In some embodiments, the camera calibration process described with regard to FIG. 2 herein may be extended to the calibration of multiple cameras on a given device (e.g., devices 800, 900, and/or 1000 described herein). As shown in FIG. 4, cameras 400 and 402 and inertial measurement 404 may be mounted onto element 406 (e.g., a locally rigid support). In some embodiments, cameras 400 and 402 may be referred to as "stereo" cameras (e.g., cameras that are in a stereoscopic configuration with one another), as they have at least partially overlapping fields of views (e.g., fields of view 408 and 410, respectively).

Calibrating more than one camera concurrently within the same optimization problem (e.g., via the processes described with regard to FIG. 5 herein) may result in a computationally expensive optimization problem. It may therefore be necessary to limit the number of points of interest that are tracked and used as input to the calibration process for the cameras in order to fit within a given power budget of the device, due to computational constraints of the device, or any other properties that defines "resource awareness" of the device. As such, a feature allocation scheme may be used to select certain points of interest from all available points of interest of the given fields of view of the multiple cameras. In some embodiments, a feature allocation scheme may prioritize certain points of interest over others and subsequently provide the prioritized points of interest as input to the calibration process for the cameras.

In some embodiments, some points of interest may be prioritized over other points of interest based on whether the points are visible and trackable within both cameras 400 and 402, meaning that the prioritized points of interest are located in the overlapping parts of the respective fields of view (e.g., fields of view 408 and 410) of the stereo cameras. As shown in FIG. 4, points of interest 412 are located both within field of view 408 and field of view 410 of cameras 400 and 402. Additional criteria for the prioritization of points of interest may pertain to the points of interest falling within certain distances of one another, the points having a certain distance to the cameras, the points having a high Laplacian value (e.g., having a sharp corner), and/or the points having an acceptable distribution across the overlapping fields of view (e.g., covering the majority of the fields of view).

In some embodiments, selected points of interest may be viewed in all respective fields of view of the multiple cameras, such as points of interest 412. However, as is discussed in further detail with regard to FIG. 5, some points of interest may still be prioritized even though they are within two out of three respective fields of view for two of the three cameras, for example. In such cases, a first camera may have part of an overlapping field of view with a second camera (but not with a third camera), and the second camera may also have another part of its field of view that overlaps with the third camera, creating a linked chain of overlapping fields of view. In examples such as this, the points of interest that may be prioritized may be tracked in the two sets of overlapping fields of view of the multiple (e.g., three or more) cameras.

Once the feature allocation scheme has been established, the selected points of interest will be tracked over time, similarly to that which was shown in FIGS. 1A and 1B with regard to timestep 1 and timestep 2.

FIG. 5 is a flow diagram illustrating a process of performing a calibration process for N cameras concurrently, according to some embodiments.

Continuing with example embodiments such as cameras 400 and 402 shown in FIG. 4, points of interest may be selected within images captured by cameras 1 through N, respectively, in blocks 500, 506, and 512. A person having ordinary skill in the art should understand that embodiments shown in FIG. 5 may represent N cameras in a stereoscopic configuration with one another, or N cameras that together create an overlapping field of view "chain," as described above with regard to FIG. 4. In some embodiments, the points of interest referenced in blocks 500, 506, and 512 may have been prioritized via a feature allocation scheme, also as described above with regard to FIG. 4.

In blocks 502, 508, and 514, the points of interest are tracked over a series of moments in time determined by the images captured by cameras 1 through N. Blocks 502, 508, and 514 may resemble block 202, and the functionalities described herein with regard to block 202.

In some embodiments, blocks 504, 510, 516, and 518 may resemble a calibration process for calibrating cameras 1 through N. In a first stage, extrinsic parameters of each camera are estimated using information from an inertial measurement unit. Blocks 504, 510, and 516 may occur simultaneously or separately, as long as extrinsic parameters are respectively estimated for each camera using a common inertial measurement unit. In a second stage of the calibration process, intrinsic and extrinsic parameters of cameras 1 through N are concurrently determined within a given optimization problem. Estimated extrinsic parameters for cameras 1 through N (e.g., blocks 504, 510, and 512) may be used as input to the second stage of the calibration process (block 518). Once convergence is reached, results of the calibration process for cameras 1 through N may be provided in block 520.

In some embodiments, calibration conditions quality metrics may be calculated for each camera being concurrently calibrated. For example, in a given scenario in which a user is accidentally obscuring or covering camera 400, but not camera 402, then camera 400 may have a low or near zero calibration conditions quality metric due to being covered, and camera 402 may have a higher calibration conditions quality metric than camera 400 due to it not being covered.

Figure 6:
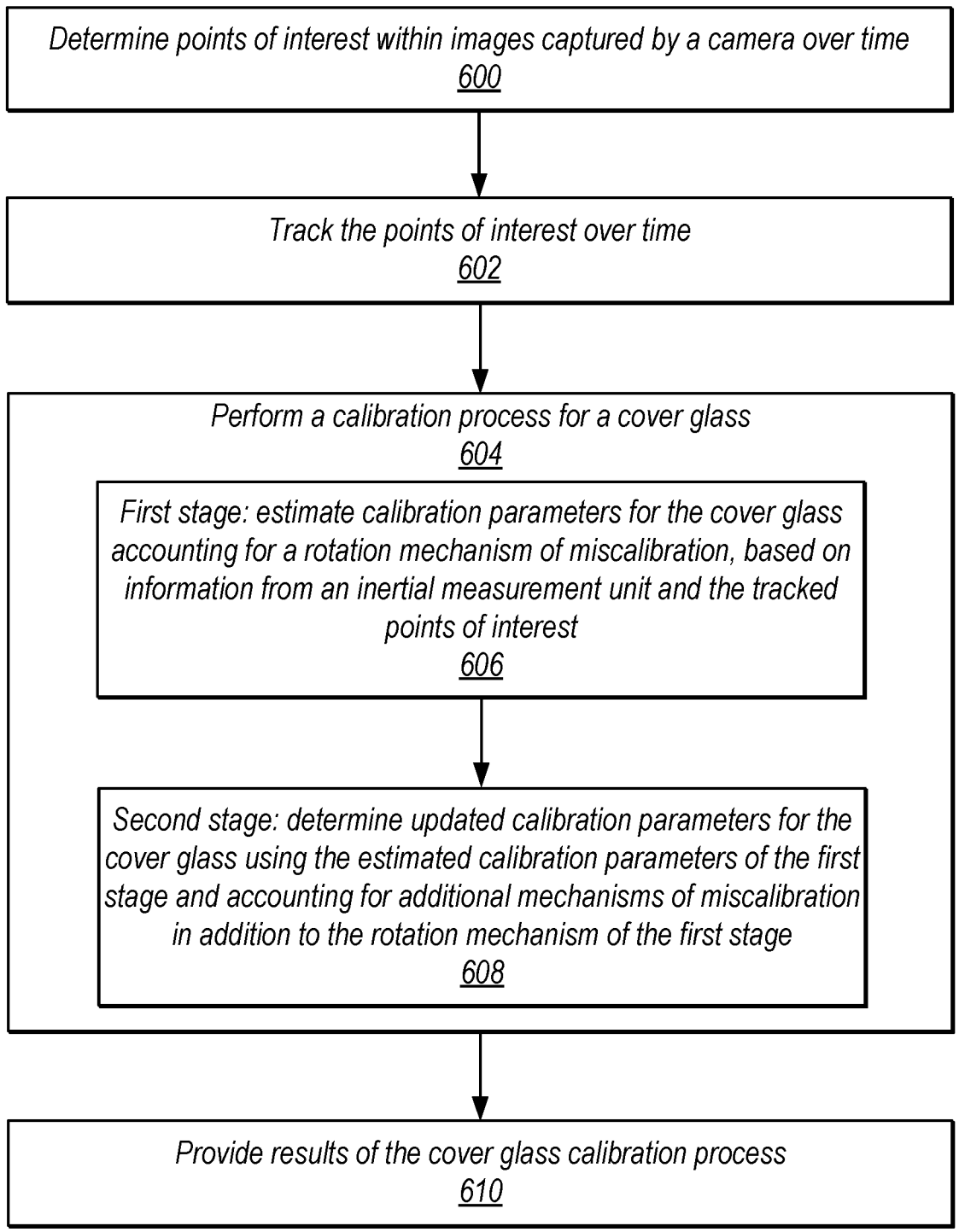
FIG. 6 is a flow diagram illustrating a process of calibrating a cover glass for a camera of a device in which a first stage of the calibration process estimates calibration parameters of the cover glass and a second stage determines updated calibration parameters of the cover glass, according to some embodiments.

FIG. 6 is a flow diagram illustrating a process of calibrating a cover glass for a camera of a device in which a first stage of the calibration process estimates calibration parameters of the cover glass and a second stage determines updated calibration parameters of the cover glass, according to some embodiments.

Figure 7:
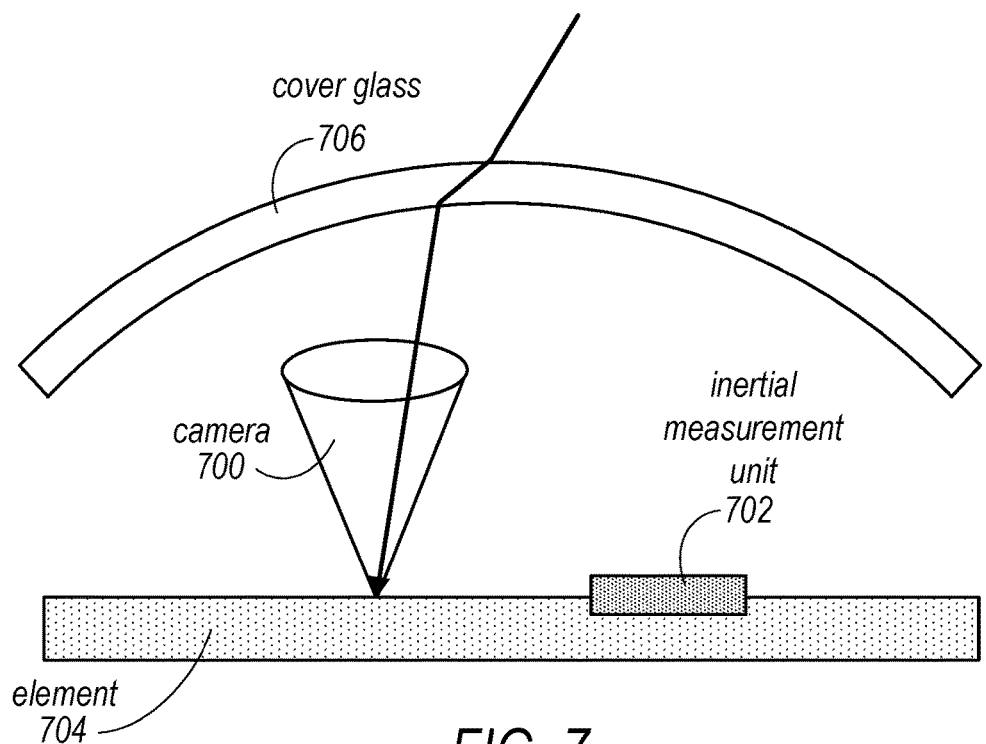
FIG. 7 illustrates an example system containing a camera and inertial measurement unit mounted on a device with a cover glass, according to some embodiments.

In some embodiments, a device with an outward facing camera may also have a cover glass that may provide protection for the camera against the outside environment, such as cover glass 706 as shown in FIG. 7. Such a cover glass may also be calibrated using similar methods and techniques as described herein. It is possible that, during usage of the device, the cover glass may be susceptible to deformation, rotation, or translation from its original factory settings and/or manufacturing specifications, and therefore the calibration process described in blocks 600-610 provide a solution for its recalibration.

In order to calibrate the cover glass, it is assumed that the associated camera and inertial measurement unit have already been calibrated (e.g., their calibration parameters are taken as ground truths for the calibration of the cover glass). For example, following a misalignment event (e.g., a drop event), a camera calibration process such as the process described in FIG. 2 herein may be used to calibrate the camera. Then, a calibration process for the cover glass may be completed using the updated results of the camera calibration process. An iterative process between calibration processes may additionally ensue in order to optimize the parameters of both the camera and the cover glass.

In block 600, points of interest are identified from images captured by the camera. Such points of interest may be the same points of interest identified during the camera calibration (e.g., those discussed in block 200), or additional points of interest may be identified specifically for the cover glass calibration. For example, in some embodiments in which the cover glass is curved, points of interest that correspond to different angles of curvature along the cover glass may be used for a more optimized cover glass calibration process. In block 602, those identified points of interest are tracked over several moments in time.

In block 604, a calibration process for the cover glass is performed in two stages. In the first stage, as described in block 606, the calibration parameters of the cover glass are estimated which account for the possibility that a miscalibration has occurred with regard to rotation of the cover glass. Information from the inertial measurement unit and information about the tracked points of interest may be used as inputs to this first stage. As described above, values from a recent camera calibration process may also be used as input to the first stage as well. In the second stage, as described in block 608, the calibration parameters of the cover glass are determined using the first stage's estimated calibration parameter values accounting for a possible rotation mechanism of miscalibration. After converging on values for the calibration parameters of the cover glass, the results are provided in block 610. Similarly to providing results of the camera calibration process as described above with regard to block 210, results of the cover glass calibration process may be provided to other applications executing on the given device that use the camera (in cases in which the camera has a cover glass associated to it). The results may also be stored locally on the device, such as in memory 1120 of computer system 1100.

FIG. 7 illustrates an example system containing a camera and inertial measurement unit mounted on a device with a cover glass, according to some embodiments.

In some embodiments, an outward-facing camera of a given device, such as camera 700 mounted onto element 704, may have a transparent cover glass, such as cover glass 706, to protect the camera during usage of the device. Cover glass 706 may be curved and its material properties (e.g., the index of refraction of the glass at various locations along the cover glass as compared to that of air, as marked by the incoming arrow in FIG. 7) may be known. Similarly to the need to recalibrate camera 700 after a misalignment event (e.g., a drop event), for example, the properties of the cover glass 706 relative to a given one or more cameras 700 may also need to be recalibrated in case the cover glass was damaged, rotated, translated, or otherwise deformed due to the misalignment event, which may cause an observable distortion in images captured by camera 700 and/or a discrepancy between expected and actual images.

The (re)calibration process of cover glass 706 may involve two stages, as discussed with regard to blocks 604, 606, and 608 in FIG. 6. In particular, the first stage of the calibration process for the cover glass may be based at least in part on information from an inertial measurement unit, such as inertial measurement unit 702, in order to estimate one or more calibration parameters of the cover glass pertaining to a possible rotation mechanism of miscalibration. Similarly to the camera calibration processes discussed herein, a calibration process for cover glass 706 may be executed using processor(s) 1110, and the program instructions for the calibration process may be stored in memory 1120, according to some embodiments.

Figure 8:
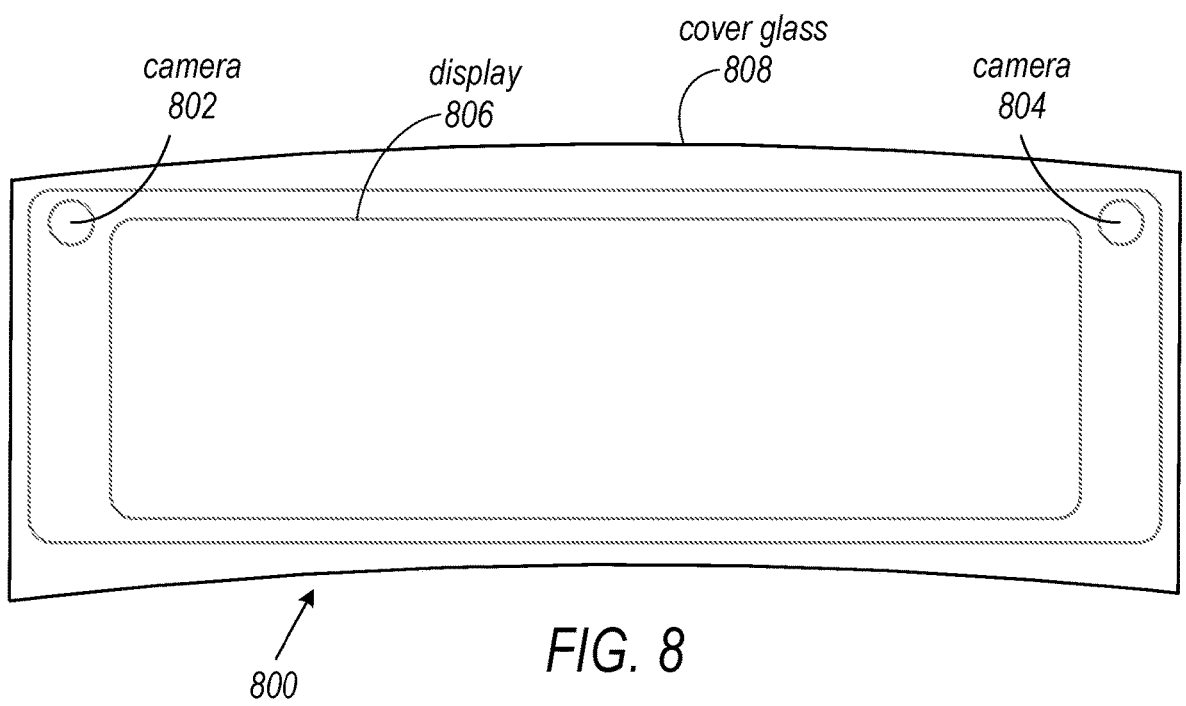
FIG. 8 illustrates an example head-mounted display (HMD) device comprising a frame onto which cameras, a cover glass, and an inertial measurement unit may be mounted, according to some embodiments.
Figure 9:
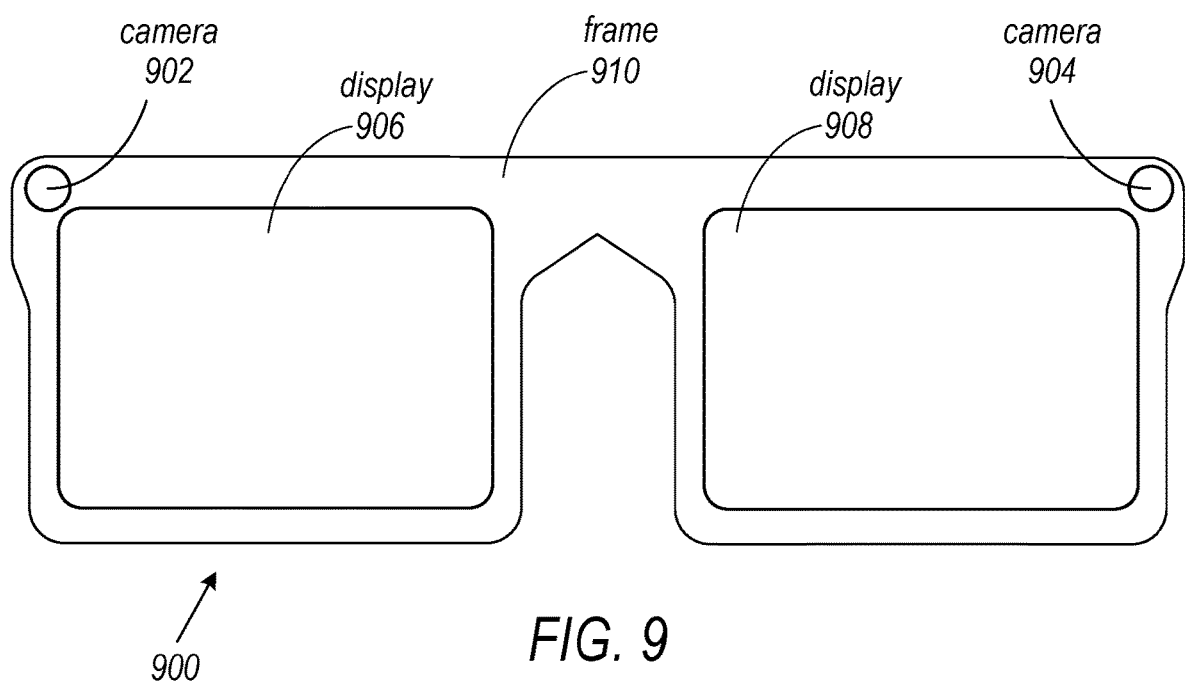
FIG. 9 illustrates another example of a head-mounted display (HMD) device comprising a frame onto which cameras, a cover glass, and an inertial measurement unit may be mounted, according to some embodiments.

FIG. 8 illustrates an example head-mounted display (HMD) device comprising a frame onto which cameras, a cover glass, and an inertial measurement unit may be mounted, according to some embodiments, and FIG. 9 illustrates another example of a head-mounted display (HMD) device comprising a frame onto which cameras and an inertial measurement unit may be mounted, according to some embodiments.

In some embodiments, the methods and techniques for executing a camera calibration process may be implemented for cameras of devices 800 and 900, which may resemble extended reality (XR) glasses, goggles, and/or other head-mounted display device designs. Device 800 may have a display for displaying in front of both eyes of the user, such as display 806, in embodiments in which device 800 has a goggles-like device frame. Alternatively, device 900 may have respective displays 906 and 908 for each eye in embodiments in which device 900 has a glasses-like device frame 910. Devices 800 and 900 may be worn on a user's head such that the display(s) are placed in front of the user's eyes and may implement any of various types of display technologies or display systems in order to display images, video, or other content to the user of the device using said displays and/or lenses. In addition, device 800 may have a cover glass, such as cover glass 808, that may be placed in front of at least cameras 802 and 804. In some embodiments, cameras 902 and 904 may be mounted onto locally rigid components of frame 910, and there may be other non-rigid components of frame 910 that may deform, such as a flexible nosepiece of frame 910. Similarly, device 800 may be attached to a user's head using an elastic band, while cameras 802 and 804 may be assumed to be mounted to locally rigid components of the goggles-like device frame of device 800.

Figure 10B:
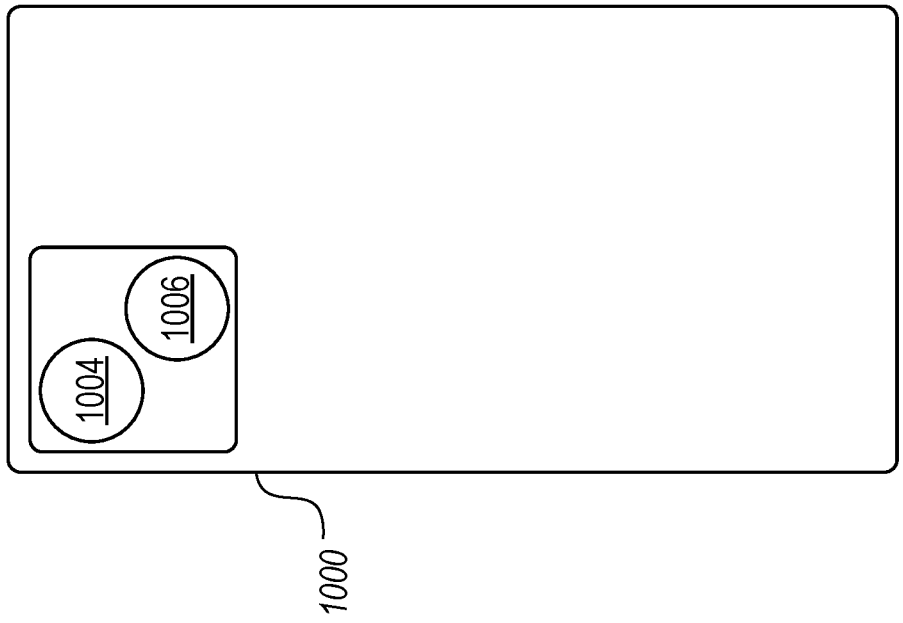
FIGS. 10A and 10B illustrate a front and rear view, respectively, of an example device onto which multiple cameras and an inertial measurement unit may be incorporated, according to some embodiments.
Figure 10A:
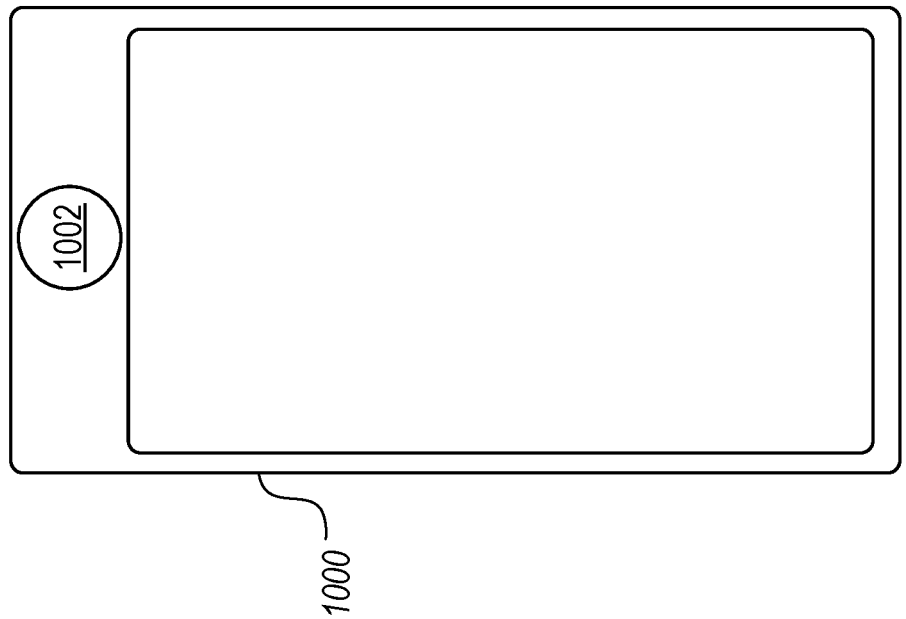

Devices 800 and 900 may have one or more cameras mounted to the respective frames, such as cameras 802 and 804 on device 800 and cameras 902 and 904 on device 900, which respectively have partially overlapping fields of view (e.g., "stereo" cameras). Infield calibration of cameras 802 and 804, and 902 and 904, may resemble embodiments discussed with regard to at least FIGS. 4 and 5 herein, using respective inertial measurement units of devices 800 or 900 (not shown in the views shown in FIGS. 8 and 9). In addition, calibration of cover glass 808 may resemble embodiments discussed with regard to at least FIGS. 6 and 7 herein. Note that devices 800 and 900, and device 1000 in the following FIGS. 10A and 10B, are given by way of example, and are not intended to be limiting. In various embodiments, the shape, size, and other features of devices 800, 900, and 1000 may differ, as well as the locations, numbers, types, and other features of the components of said devices. Devices 800 and 900 may include additional sensors that may collect information about the user's environment (additional depth information, etc.) and/or about the user themselves (e.g., eye or gaze tracking) as well. In some embodiments, video streams of the real environment captured by cameras 802, 804, 902, and 904 may be processed by one or more processors located on devices 800 or 900, respectively, in order to render augmented or mixed reality frames that include virtual content overlaid on the view of the real environment, and the rendered frames may then be provided to the display systems (e.g., displays 806, or 906 and 908, respectively).

Devices 800 and 900 may also be configured to receive input and/or other information via a wireless interface (e.g., network interface 1140). One or more processors implemented locally on devices 800 and 900 may resemble various types of processors, image signal processors (ISPs), graphics processing units (GPUs), coder/decoders (codecs), system on a chip (SOC), CPUs, and/or other components for processing and rendering video and/or images, according to some embodiments. Processors of devices 800 and 900 may render frames that include virtual content based at least in part on inputs obtained from the sensors and/or cameras of devices 800 and 900, and may then provide the frames to the respective display systems.

Devices 800 and 900 may also include memory and/or local storage (e.g., memory 1120) that may be used to record video and/or images captured by cameras 802 and 804, or 906 and 908, respectively. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments, DRAM may be used as temporary storage of images or video for processing, but other storage options may be used in an HMD device to store processed data, such as Flash or other "hard drive" technologies.

FIGS. 10A and 10B illustrate a front and rear view, respectively, of an example device onto which multiple cameras and an inertial measurement unit may be incorporated, according to some embodiments.

In some embodiments, the methods and techniques for executing a camera calibration process may also be implemented for cameras of device 1000. Device 1000 may have similar display and image processing functionalities such as those described above with regard to devices 800 and 900, however device 1000 may resemble a tablet or smartphone rather than a head-mounted display. In particular, device 1000 may have multiple outward facing cameras, such as camera 1002 on the front of device 1000 and cameras 1004 and 1006 on the back of device 1000. Device 1000 may also have an inertial measurement unit that may be used as input to a camera calibration process for cameras 1002, 1004, and 1006 that may be located inside of the device frame (not depicted in the views shown in FIG. 10A or 10B). In some embodiments, distinct camera calibration processes may exist for device 1000: a first calibration process for front-facing camera 1002 (e.g., a calibration process such as the calibration process described with regard to FIG. 2 herein), and a second calibration process for one or more of the rear-facing cameras 1004 and 1006. For the rear-facing cameras 1004 and 1006, each camera may be calibrated separately or concurrently (e.g., using a calibration process such as the calibration process described with regard to FIG. 5 herein). As camera 1002 does not have an overlapping field of view with cameras 1004 or 1006 by nature of camera 1002 facing 180° away from cameras 1004 and 1006, the calibration processes may occur separately, even if they both make use of the same inertial measurement unit of device 1000.

Figure 11:
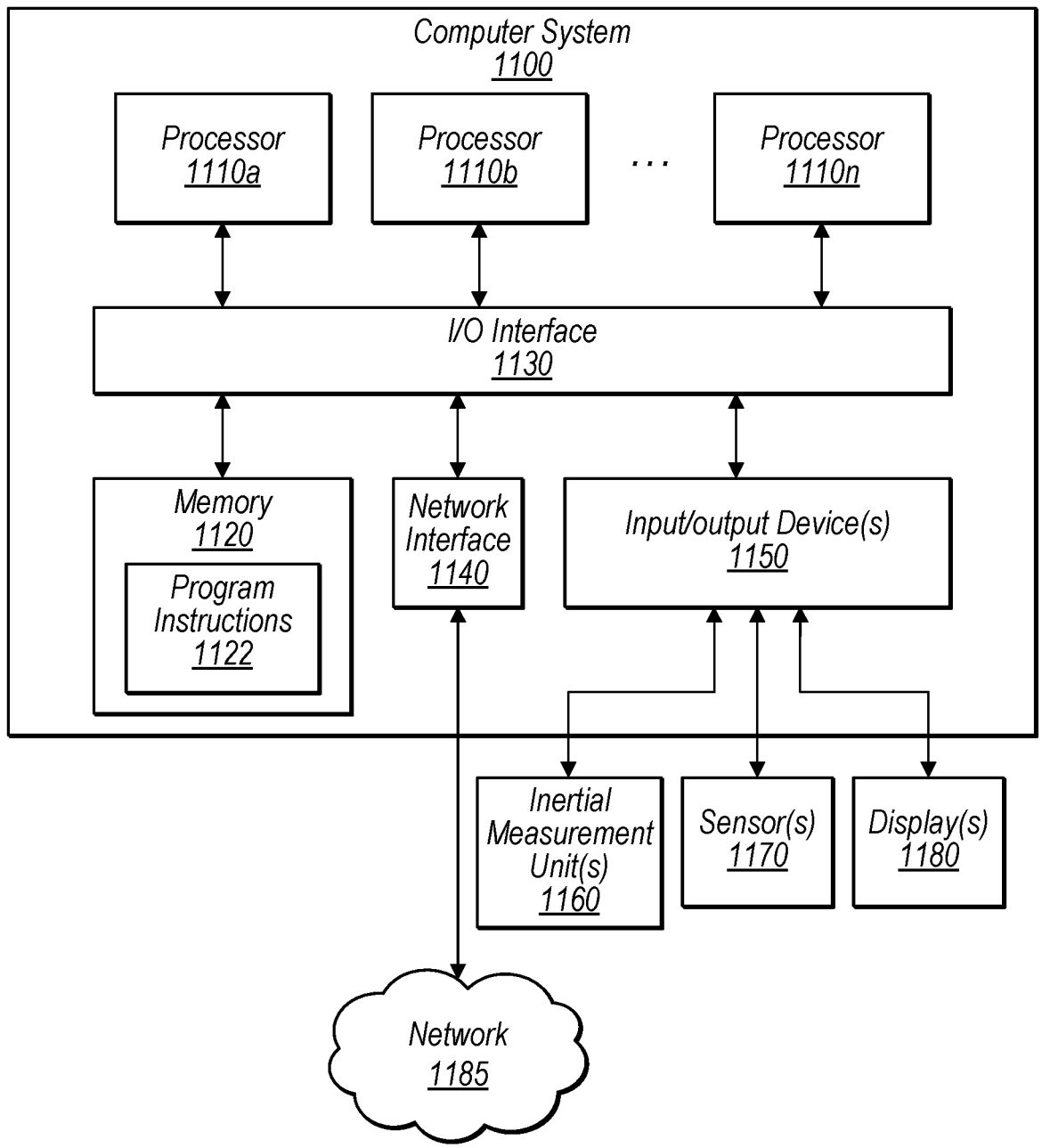
FIG. 11 is a block diagram illustrating an example computing device that may be used in at least some embodiments.

FIG. 11 is a block diagram illustrating an example computing device that may be used in at least some embodiments.

FIG. 11 illustrates exemplary computer system 1100 that may be used to perform the camera and cover glass calibrations as described above with regard to FIGS. 1A-10B. In different embodiments, computer system 1100 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of program instructions for performing calibration processes, tracking points of interest, and providing/broadcasting results, as described herein, may be executed in one or more computer systems 1100, which may interact with various other devices, such as a LiDAR. Note that any component, action, or functionality described above with respect to FIGS. 1A-10B may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as inertial measurement unit(s) 1160 (e.g., inertial measurement units 102, 302, 312, 402 and 702), sensor(s) 1170 (cameras 100, 300, 310, 400, and 700), and display(s) 1180 (e.g., displays 806, 906, and 908). In some cases, it is contemplated that embodiments may be implemented using a single instance of computer system 1100, while in other embodiments multiple such computer systems, or multiple nodes making up computer system 1100, may be configured to host different portions or instances program instructions for performing camera calibrations as described above for various embodiments. For example, in some embodiments, some elements of the program instructions may be implemented via one or more nodes of computer system 1100 that are distinct from those nodes implementing other elements.

In some embodiments, computer system 1100 may be implemented as a system on a chip (SoC). For example, in some embodiments, processors 1110, memory 1120, I/O interface 1130 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1120 may be configured to store program instructions 1122 for calibration processes and/or sensor data accessible by processor 1110. In various embodiments, system memory 1120 may be implemented using any suitable memory technology, such as static random-access memory (SRAM), synchronous dynamic RAM (SDRAM), nonvolatile/Flash-type memory, or any other type of memory. In the illustrated embodiment, program instructions 1122 may be configured to implement any of the functionality described above. In some embodiments, program instructions and/or data may be received, sent or stored upon different types of computer-accessible media or on similar media separate from system memory 1120 or computer system 1100.

In some embodiments, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, inertial measurement unit(s), sensors, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included.

Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

Virtual Reality

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

Augmented Reality and Mixed Reality

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
   a camera;
   an inertial measurement unit;
   one or more processors; and
   a memory, storing program instructions that when executed using the one or more processors, cause the one or more processors to:
     determine points of interest within images captured by the camera over a plurality of moments in time;
     track the points of interest over the plurality of moments in time;
     perform a calibration process for the camera, wherein:
       the tracked points of interest are provided as input to the calibration process; and
       the calibration process comprises:
         a first stage, wherein:
           the first stage comprises estimating one or more extrinsic parameters of the camera; and
           the estimating is based, at least in part, on information from the inertial measurement unit for the plurality of moments in time and on the tracked points of interest; and
         a second stage, wherein:
           the second stage comprises concurrently determining the one or more extrinsic parameters of the camera and one or more intrinsic parameters of the camera; and
           the estimated one or more extrinsic parameters of the first stage are used in said concurrently determining of the second stage; and
     provide results of the calibration process.

2. The device of claim 1, wherein the program instructions, when executed using the one or more processors, further cause the one or more processors to:
   determine a calibration conditions quality metric based, at least in part, on the captured images of the camera; and
   responsive to determining that the calibration conditions quality metric is above a given threshold, perform the calibration process for the camera.

3. The device of claim 2, wherein the calibration conditions quality metric is further determined based, at least in part, on one or more of:
   a quality of lighting in the captured images;
   respective distances between the tracked points of interest and the camera;
   movement of the respective tracked points of interest over the plurality of moments in time; or movement of the camera over the plurality of moments in time.

4. The device of claim 1, wherein:
the device further comprises a second camera;
the camera and the second camera are in a stereoscopic configuration with one another; and
the program instructions, when executed using the one or more processors, further cause the one or more processors to:
  determine additional points of interest within additional images captured by the second camera over the plurality of moments in time; and
  track the additional points of interest within the additional images over the plurality of moments in time.

5. The device of claim 4, wherein the calibration process for the camera is extended to comprise calibration of the second camera, wherein to perform calibration of the camera and the second camera, the program instructions, when executed using the one or more processors, further cause the one or more processors to:
provide the tracked additional points of interest within the additional images as part of the input to the calibration process;
perform an additional stage of the calibration process, the additional stage comprising:
  estimating one or more extrinsic parameters of the second camera, wherein the estimating of the additional stage of the calibration process is based, at least in part, on information from the inertial measurement unit for the plurality of moments in time and the tracked additional points of interest of the additional images captured by the second camera, and
wherein the determining the one or more extrinsic parameters of the second stage of the calibration process further comprises concurrently determining the one or more extrinsic parameters of the second camera one or more intrinsic parameters of the second camera in addition to determining the one or more extrinsic parameters of the camera and the one or more intrinsic parameters of the camera.

6. The device of claim 5, wherein the program instructions, when executed using the one or more processors, further cause the one or more processors to:
calculate one or more calibration conditions quality metrics based, at least in part, on the captured additional images of the camera and the second camera; and
responsive to determining that the one or more calibration conditions quality metrics are above a given threshold, perform the calibration process concurrently for the camera and the second camera.

7. The device of claim 1, wherein:
the device further comprises a cover glass; and
the program instructions, when executed using the one or more processors, further cause the one or more processors to:
perform a calibration process for the cover glass, wherein:
  the tracked points of interest are provided as input to the cover glass calibration process; and
  the cover glass calibration process comprises:
    a first stage, wherein the first stage comprises estimating calibration parameters for the cover glass accounting for a rotation mechanism of miscalibration, based, at least in part, on information from the inertial measurement unit for the plurality of moments in time and on the tracked points of interest; and
    a second stage, wherein:
      the second stage comprises determining updated calibration parameters for the cover glass accounting for additional mechanisms of miscalibration in addition to the rotation mechanism of the first stage; and
      the estimated calibration parameters of the first stage are used in said determining of the second stage.

8. The device of claim 1, wherein the one or more extrinsic parameters of the camera comprise:
rotational parameters of the camera relative to a rigid body of the device; or
translational parameters of the camera relative to a rigid body of the device.

9. The device of claim 1, wherein the one or more intrinsic parameters of the camera comprise:
a deviation in focal length of the camera as compared to a manufacturing specification for the camera; or
a deviation in principal point of the camera as compared to a manufacturing specification for the camera.

10. The device of claim 1, wherein the device is a head-mounted display (HMD) device.

11. A method, comprising:
determining points of interest within images captured by a camera of a device over a plurality of moments in time;
tracking the points of interest over the plurality of moments in time;
performing a calibration process for the camera, wherein performing the calibration process comprises:
  estimating, during a first stage of the calibration process, one or more extrinsic parameters of the camera, wherein the estimating is based at least in part on information from an inertial measurement unit of the device for the plurality of moments in time and on the tracked points of interest; and
  concurrently determining, during a second stage of the calibration process, the one or more extrinsic parameters of the camera and one or more intrinsic parameters of the camera, wherein the estimated one or more extrinsic parameters of the first stage are used in said concurrently determining; and
providing results of the calibration process.

12. The method of claim 11, further comprising:
calculating a calibration conditions quality metric based, at least in part, on the captured images of the camera;
refraining from performing the calibration process responsive to the calibration conditions quality metric being below a threshold value; and
proceeding with performing the calibration process responsive to the calibration conditions quality metric being above the threshold value.

13. The method of claim 11, further comprising:
determining additional points of interest within additional images captured by a second camera over the plurality of moments in time, wherein the camera and the second camera have overlapping fields of view and at least some of the points of interest in the image and the additional points of interest in the additional images correspond to same objects in the fields of view of the camera and the second camera;
tracking the additional points of interest over the plurality of moments in time; and wherein the calibration process further comprises:
estimating, during an additional stage in the calibration process, one or more extrinsic parameters of the second camera, wherein the estimating is based, at least in part, on information from the inertial measurement unit for the plurality of moments in time and on the additional tracked points of interest; and
said concurrently determining, during the second stage of the calibration process, further comprises determining the one or more extrinsic parameters of the second camera and one or more intrinsic parameters for the second camera in addition to the one or more extrinsic parameters of the camera and the one or more intrinsic parameters of the camera, wherein the estimated one or more extrinsic parameters estimated for the second camera at the additional stage are used in said concurrently determining of the second stage.

14. The method of claim 11, wherein said performing the calibration process for the camera further comprises:
selecting a number of the tracked points of interest to be used in the calibration process based, at least in part, on one or more of the following:
a level of current power consumption of the device;
a level of current processing power of the device; or
a distribution of common features within respective fields of view of the camera and a second camera, wherein the common features in the respective fields of view correspond to points of interest included in images captured via the camera and additional points of interest included in additional images captured via the second camera, wherein the calibration process is a process for concurrently calibrating the camera and the second camera.

15. The method of claim 11, further comprising:
performing a calibration process for a cover glass of the device, wherein performing the calibration process for the cover glass comprises:
estimating, in a first stage of the cover glass calibration process, calibration parameters for the cover glass accounting for a rotation mechanism of miscalibration, based, at least in part, on information from the inertial measurement unit for the plurality of moments in time and on the tracked points of interest; and
determining, in a second stage of the cover glass calibration process, updated calibration parameters for the cover glass accounting for additional mechanisms of miscalibration in addition to the rotation mechanism of the first stage, wherein the estimated calibration parameters of the first stage are used in said determining of the second stage.

16. The method of claim 11, further comprising:
storing the provided results of the calibration process;
responsive to performing the calibration process for the camera at a moment after the plurality of moments in time, providing updated results of the calibration process;
comparing the results and the updated results;
determining that one or more of the updated results has changed more than a threshold amount with respect to the results; and
sending the updated results to applications executing on the device that use the camera.

17. A non-transitory computer-readable medium storing program instructions that, when executed using one or more processors, cause the one or more processors to:
determine points of interest within images captured by a camera of a device over a plurality of moments in time;
track the points of interest over the plurality of moments in time;
perform a calibration process for the camera, wherein to perform the calibration process the program instructions cause the one or more processors to:
estimate, during a first stage of the calibration process, one or more extrinsic parameters of the camera, wherein to estimate is based at least in part on information from an inertial measurement unit of the device for the plurality of moments in time and on the tracked points of interest; and
concurrently determine, during a second stage of the calibration process, the one or more extrinsic parameters of the camera and one or more intrinsic parameters of the camera, wherein the estimated one or more extrinsic parameters of the first stage are used in said concurrently determine; and
provide results of the calibration process.

18. The non-transitory computer-readable medium of claim 17, wherein the program instructions, when executed using the one or more processors, further cause the one or more processors to:
calculate a calibration conditions quality metric based, at least in part, on one or more of:
a quality of lighting in the captured image;
respective distances between the tracked points of interest and the camera;
movement of the respective tracked points of interest over the plurality of moments in time; or
movement of the camera over the plurality of moments in time.

19. The non-transitory computer-readable medium of claim 17, wherein the program instructions, when executed using the one or more processors, further cause the one or more processors to:
determine additional points of interest within additional images captured by a second camera over the plurality of moments in time, wherein the camera and the second camera have overlapping fields of view and at least some of the points of interest in the image and the additional points of interest in the additional images correspond to same objects in the fields of view of the camera and the second camera;
track the additional points of interest over the plurality of moments in time; and
wherein the calibration process further comprises:
estimate, during an additional stage in the calibration process, one or more extrinsic parameters of the second camera, wherein to estimate is based, at least in part, on information from the inertial measurement unit for the plurality of moments in time and on the additional tracked points of interest; and
said concurrently determine, during the second stage of the calibration process, further comprises determining the one or more extrinsic parameters of the second camera and one or more intrinsic parameters for the second camera in addition to the one or more extrinsic parameters of the camera and the one or more intrinsic parameters of the camera, wherein the estimated one or more extrinsic parameters for the second camera estimated at the additional stage are used in said concurrently determine of the second stage.

20. The non-transitory computer-readable medium of claim 17, wherein the program instructions, when executed using the one or more processors, further cause the one or more processors to:
 perform a calibration process for a cover glass for the camera, wherein to perform the calibration process for the cover glass the program instructions cause the one or more processors to:
  estimate, in a first stage of the cover glass calibration process, calibration parameters for the cover glass accounting for a rotation mechanism of miscalibration, based, at least in part, on information from the inertial measurement unit for the plurality of moments in time and on the tracked points of interest; and
  determine, in a second stage of the cover glass calibration process, updated calibration parameters for the cover glass accounting for additional mechanisms of miscalibration in addition to the rotation mechanism of the first stage, wherein the estimated rotation parameters of the first stage are used in said determining of the second stage.

* * * * *